United States Patent
Vane et al.

(10) Patent No.: US 7,644,048 B2
(45) Date of Patent: Jan. 5, 2010

(54) SYSTEM, METHOD AND SOFTWARE FOR COGNITIVE AUTOMATION

(75) Inventors: Russ Vane, Herndon, VA (US); Stephen Lindner, Solise, MI (US)

(73) Assignee: General Dynamics Advanced Information Systems, Inc., Fairfax, VA (US)

(*) Notice: Subject to any disclaimer, the term of this patent is extended or adjusted under 35 U.S.C. 154(b) by 0 days.

(21) Appl. No.: 11/260,474

(22) Filed: Oct. 28, 2005

(65) Prior Publication Data

US 2007/0112696 A1   May 17, 2007

(51) Int. Cl.
*G06N 5/00* (2006.01)

(52) U.S. Cl. .......................... 706/10; 706/45

(58) Field of Classification Search .......... 706/10, 706/45; 700/182; 707/1, 3; 709/201, 202, 709/223, 224
See application file for complete search history.

(56) References Cited

U.S. PATENT DOCUMENTS

| | | | |
|---|---|---|---|
| 5,155,803 A | 10/1992 | Barabash et al. | |
| 5,204,940 A | 4/1993 | Kitagawa et al. | |
| 5,581,664 A | 12/1996 | Allen et al. | |
| 6,026,399 A | 2/2000 | Kohavi et al. | |
| 6,086,617 A | 7/2000 | Heckmann et al. | |
| 6,088,689 A * | 7/2000 | Kohn et al. | 706/10 |
| 6,134,580 A * | 10/2000 | Tahara et al. | 709/202 |
| 6,336,109 B2 | 1/2002 | Howard | |
| 6,349,325 B1 * | 2/2002 | Newcombe et al. | 709/202 |
| 6,415,224 B1 | 7/2002 | Wako et al. | |
| 6,493,697 B1 * | 12/2002 | Stier et al. | 706/50 |
| 6,745,089 B2 | 6/2004 | Rasmussen et al. | |
| 6,816,847 B1 | 11/2004 | Toyama | |
| 6,851,115 B1 * | 2/2005 | Cheyer et al. | 719/317 |
| 6,859,931 B1 * | 2/2005 | Cheyer et al. | 719/317 |
| 0,071,150 A1 | 3/2005 | Nasypny | |
| 6,990,670 B1 * | 1/2006 | Hodjat | 719/317 |
| 7,036,128 B1 * | 4/2006 | Julia et al. | 719/317 |
| 7,124,119 B2 * | 10/2006 | Bigus et al. | 706/10 |
| 2001/0039562 A1 * | 11/2001 | Sato | 709/202 |
| 2002/0116350 A1 * | 8/2002 | Hodjat et al. | 706/11 |
| 2004/0107190 A1 * | 6/2004 | Gilmour et al. | 707/3 |
| 2004/0198386 A1 * | 10/2004 | Dupray | 455/456.1 |
| 2005/0114500 A1 * | 5/2005 | Monk et al. | 709/224 |
| 2005/0114859 A1 * | 5/2005 | Srinivasa | 718/100 |
| 2007/0011281 A1 * | 1/2007 | Jhoney et al. | 709/220 |

* cited by examiner

Primary Examiner—Wilbert L Starks, Jr.
(74) Attorney, Agent, or Firm—Steptoe & Johnson LLP

(57) ABSTRACT

Software code may include code to receive a first request associated with a discrete problem that is broadcast over a network of cobots. The request may be accepted based on the discrete problem to be solved. The code may also include code to determine whether a utility function associated with the plan to solve the discrete problem meets a threshold. The plan may include a plurality of steps. A report including information related to the chosen plan may be sent to the requesting cobot. Information related to the plan may include information such as the forecasted outcome of the plan. The cobot may then receive permission to implement the chosen plan. The plan may be implemented before any subplans are known or are determined to be possible. In the event that a subplan is required to carry out the plan, then a second request may be broadcast to a plurality of other cobots in the network. One or more of the plurality of other cobots may receive this request and the process may repeat at that cobot as described above. The cobots may be configured in a network of cobots to solve complex problems.

31 Claims, 11 Drawing Sheets

SYSTEM, METHOD AND SOFTWARE FOR COGNITIVE AUTOMATION

FIELD OF THE INVENTION

The invention relates to systems, methods and software for solving problems. More particularly, the invention relates to systems, methods and software for cognitive automation that uses agents to solve discrete problems associated with an input problem.

BACKGROUND OF THE INVENTION

For many years researchers in the field of artificial intelligence have attempted to produce processor-based software architectures that 'think' more like humans. Some examples of technology that embody so-called 'artificial intelligence' include planners and networks of problem solving agents. To date, however, the use of agents and planners has been limited in both applicability and in speed. This is because these systems do not operate in the same way that the human brain functions.

For example, U.S. Pat. No. 5,546,594 to Wazumi discloses a problem solver that utilizes a network of agents. These agents can cooperate to solve a particular problem. Each agent in the network of agents includes information associated with the remaining agents and required to select agents suitable for a cooperative problem solving. This problem solver requires that each of the agents include information relevant to the other agents in the network with which that agent may need to cooperate with. This is a cumbersome process when new agents are added to the network because the agents are required to essentially assimilate with one another. Additionally, this problem solver requires the agents to know which other agents in the network can solve aspects of problems a priori. Thus, as the networks of agents expands, the amount of storage space required to facilitate problem solving using this network also increases.

Another exemplary prior art problem solver is disclosed on U.S. Pat. No. 6,851,115 to Cheyer et al. This patent discloses a software-based architecture including a number of cooperative agents. Communication between the agents is fostered by a facilitator agent. According to some embodiments disclosed in this patent, interagent communication languages are used to enable client agents to make requests in the form of arbitrary complex goal expressions that may be solved using the facilitator agent. The facilitator agent is responsible for matching requests, from users and agents, with descriptions of the capabilities of other agents within the network. The use of this facilitator agent, however, can also become cumbersome as the number of agents increase.

Therefore the present inventors have recognized a deficiency in the prior art systems for distributed problem solving and/or planning in that as the networks become larger, they inherently become much more inefficient. Moreover, with increasing size of the networks, additional memory is typically needed and is associated with, for example, each individual agent or a select group of agents in the network. Therefore, what is needed is a network of interrelated agents that can operate without prior knowledge regarding the other agents in the network. Accordingly, the present invention is directed to solving at least one of these exemplary problems associated with the prior art by providing a modular network of interrelated software agents or "cobots."

SUMMARY OF THE INVENTION

Thus, the present invention seeks to address at least some of the foregoing problems identified in prior art intelligent architectures. The present invention includes systems, methods and software for solving problems. More particularly, the invention relates to systems, methods and software for cognitive automation that uses agents to solve discrete problems associated with an input problem. Thus, the present invention relates to processor-readable software stored on a processor-readable medium. The code may include code to receive a first request from a cobot. This request may be associated with a discrete problem that is broadcast over a network of cobots. The processor-readable software code may also include code to accept the request based on the discrete problem to be solved. The code may also include code to determine whether a utility function associated with the plan to solve the discrete problem meets a threshold. The plan may include a plurality of steps. A report to the requesting cobot may be made. This report may include information related to the chosen plan. According to one embodiment of the invention, the information related to the plan may include information such as the forecasted outcome of the plan. The cobot may then receive an indication from the requesting cobot that the plan should be implemented. The indication may include permission to implement the chosen plan. This plan may be implemented before any subplans are known or are determined to be possible. In the event that a subplan is required to carry out the plan, then a second request may be broadcast to a plurality of other cobots in the network. One or more of the plurality of other cobots may receive this request and the process may repeat at that cobot as described above. Then at least one of the plurality of other cobots in the network may implement the necessary subplans. Then the cobot that received the initial request from the requesting cobot may return an indicia of success to the cobot sending the first request when an implementing cobot in a network of cobots has obtained a desired outcome for the cobot broadcasting the second request.

According to another aspect of the present invention, the code to accept the request can include code to implement an applicability function for determining if the receiving cobot can solve the discrete problem. According to yet another aspect of the invention, the code to determine whether a utility function associated with the plan to solve the discrete problem meets a threshold is based on a confidence score. According to another aspect of the present invention, the code to determine whether a utility function associated with a discrete problem meets a threshold includes implementing at least one, and in some embodiments, at least two of the following functions: a critic function, a goal function, and an applicability function. According to yet another aspect of the present invention, the processor-readable software code can be configured to implement a critic function. According to this exemplary embodiment, the critic function may be configured to determine the status of the plan based on a predetermined schedule uniquely associated with that plan.

According to yet another embodiment of the present invention, the processor-readable software code may be configured to implement a critic function. According to this exemplary embodiment of the invention, the critic function may be configured to report to the cobot sending the first request when the implementation of the plan is ahead of schedule. This schedule may be uniquely associated with the chosen plan.

According to yet another embodiment of the present invention, the first request may be transmitted using a cobot protocol. The cobot protocol may include a unique identifier associated with the cobot that sent the first request. Moreover, the protocol may also include a task value string associated with the discrete problem.

The present invention may also include a network of modules. These modules may be stored on a processor-readable medium and may be embodied as software-readable processor code. This network may include a first and second cobot modules. The first cobot module may be configured to receive input data associated with a problem to be solved. The first cobot module may also be configured to broadcast a first request to the network of modules. This first request may be based on the input data associated with the problem to be solved. The second cobot module may be configured to receive a first request from the first cobot module and may be configured to accept that request. The second cobot module may also be configured to determine whether a utility function associated with a plan to solve the discrete problem meets a threshold. This plan may, according to one embodiment of the present invention, include a number of steps. The second cobot module may also be configured to report to the first cobot module a forecasted outcome associated with the chosen plan. The first cobot may be configured to receive this request and either grant or deny permission to implement the chosen plan. In an embodiment of the invention in which permission to implement the chosen plan is granted, the plan may be implemented by the second cobot module before any subplans are determined to be possible.

According to one embodiment of the present invention, the second cobot module may be configured to broadcast a second request to the network of modules. This second request may be associated with a subproblem associated with the plan implemented by the second cobot. According to yet another embodiment of the invention, the network of modules may include a third cobot module. The third cobot module may be configured to receive the second request from the second cobot module and accept the request from the second cobot module. The third cobot module may be configured to determine whether a utility function associated with the subplan to solve the subproblem meets a threshold. This subplan can include a plurality of steps. The third cobot module may also be configured to report to the second cobot module. This report may include information such as, for example, the forecasted outcome of the chosen subplan. The third cobot module may then be configured to receive permission (or a denial of permission) associated with a determination regarding whether or not to implement the chosen subplan. If the third cobot module receives permission to implement the chosen subplan, the subplan may be implemented before any further subplans are known or determined to be possible.

According to another embodiment of the present invention, the second cobot module may be configured to return an indicia of success to the first cobot module when all subplans have been returned to the second cobot module. According to yet another embodiment of the present invention, the first cobot module may be configured to broadcast the request using a protocol. This protocol may include an identifier uniquely associated with the first cobot and a task value string associated with the problem. According to yet another embodiment of the present invention, the second cobot module in the network may be configured to accept the request based on an applicability function. This applicability function may be configured to identify whether the second cobot module can solve the problem based on the request received from the first cobot module. According to yet another embodiment of the present invention, the second cobot module may be configured to report to the first cobot module based on a protocol that includes an identifier uniquely associated with the first cobot module. According to yet another embodiment of the present invention, the chosen plan may be a satisfactory plan. Alternatively, the second cobot module may be configured to determine whether a utility function associated with a plan to solve the discrete problem meets a threshold and the determination may be made without requiring an optimal plan.

The invention may also include a method. The method may include a step of receiving a first request from a module. The request may be associated with a discrete problem. This request may be broadcast over a network of discrete modules. The method may also include a step of accepting the request based on the discrete problem to be solved. The method may also include a step of determining whether a utility function associated with the plan to solve the discrete problem meets a threshold. The plan may include a number of different steps. The method may also include a step of reporting to the requesting module a forecasted outcome associated with the chosen plan. Additionally, the method may also include a step of receiving permission to implement the chosen plan. After permission has been received to implement the plan, the plan may be implemented. The implementation of the plan may occur before subplans are determined to be possible. A second request may be broadcast to a plurality of other discrete modules in the network in order to permit the implementation of any other necessary subplans. Some indicator of success may be returned to the module that sent the first request after all subplans have been returned to the module broadcasting the second request.

According to another embodiment of the invention, accepting the request may include implementing an applicability function to determine if the receiving cobot can solve the discrete problem. Additionally or in the alternative, a step of determining whether a utility function associated with the plan to solve the discrete problem may be based on a confidence score. The method may include determining whether the utility function associated with the discrete problem meets a threshold may include implementing one or more of the following: a critic function, a goal function, and an applicability function. According to yet another embodiment of the present invention, the method may include determining a status of the plan based on a predetermined schedule that is uniquely associated with a particular plan. According to yet another embodiment of the present invention, the method may include using a critic function that is configured to produce an output to be reported to the module that sent the first request. This outputting may be performed when the implementation of the plan is ahead of a predetermined schedule uniquely associated with the plan. The method may also include a step of monitoring the status of the implemented plan based on a schedule associated with the chosen plan.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference the to the Figures in which various embodiments of the present invention are shown. The subject matter of this disclosure may, however, be embodied in many different forms and should not be construed as being limited to the embodiments set forth herein.

As used herein the term "cobot" refers to a software module for performing a particular task. A cobot may be an agent for solving a particular problem, for example. According to an embodiment of the present invention, a cobot may include software, hardware and/or midware.

As used herein the term "cogbot" refers to a network of cobots. As described above a cobot may be a software module for performing a particular task or may include software, hardware and/or midware.

The terms "plan" and "subplan" are intended to be frames of reference for determining where in the cogbot the particular steps or functions are being performed. Subplans generally will be additional steps or an additional solution needed to complete a plan. A cobot implementing the plan will typically broadcast requests for a cobot to carry out a subplan. The term "plan" is not necessarily intended to refer to the problem that is input into the cogbot, but rather, as a frame of reference for use in connection with the description of a cobot that has been asked to perform a particular task either by direct input, or from a requesting cobot somewhere else in the network. Typically, however, the subplans will be dependent on the plans. This means that, in general, subplans will be used to complete a plan.

Figure 1:
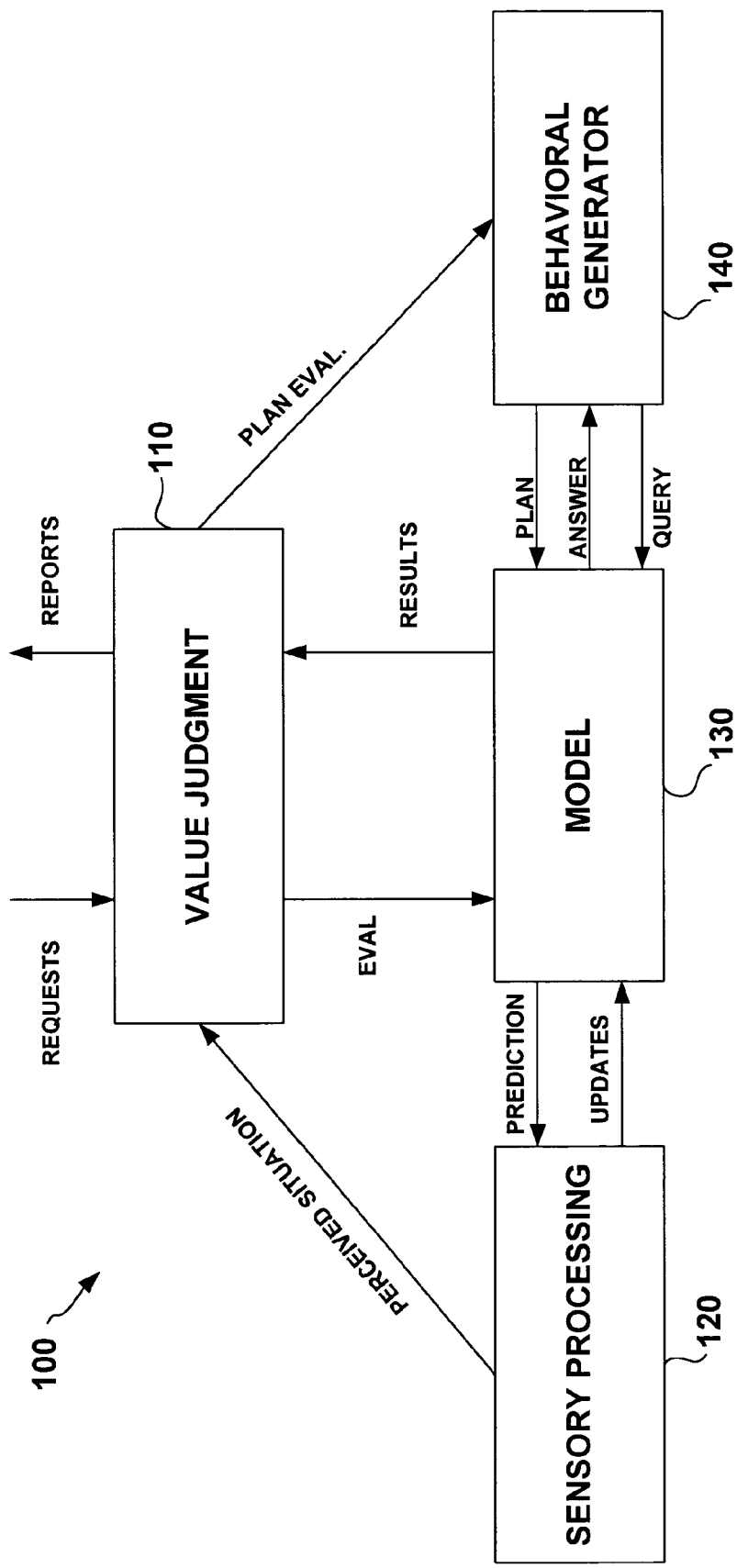
FIG. 1 shows a functional block diagram of a cobot according to an exemplary embodiment of the present invention.

FIG. 1 shows a functional block diagram of a cobot according to an exemplary embodiment of the present invention. A cobot 100 may include a value judgment module 110. The value judgment module may be configured to receive requests from other cobots or modules in the network and may be configured to report back to a requesting cobot or module in the network based on a plan that is selected to solve the particular problem associated with the request received at the cobot 100. The value judgment module 110 may be configured to interface with a sensory processing module 120, a model module 130 and a behavior generator module 140. These modules may be configured to perform particular processes and then relay information back to the judgment module 100 as shown in FIG. 1.

For example, the judgment module 110 may be configured to request that the behavior generator module 140 determine a particular plan associated with the request received from the requesting cobot. The behavior generator module 140 may be configured to query the model module 130 for model and state information to complete a particular plan. Each particular plan has specific information that may be required and associated with that plan. The behavior module may then be configured to receive an answer from the model module 130. Based on this answer, the behavioral generator module 140 may be configured to determine a plan for solving the problem associated with the request from the requesting cobot. After the behavioral generator module 140 has determined which plan to utilize, the plan is reported back to the model module 130.

The model module 130 may be configured to be a dynamic module and may change the various models contained within the model module 130 based on information received from sensory processing module 120. The sensory processing module 120 may be configured to receive sensor data from an external sensor or other input and relay that both to the model module 130 so that the various models may be evaluated for possible updates based on the sensor data, and to the value judgment module 110 so that that the value judgment module can make a final evaluation regarding the efficacy of a particular plan that is received based on the interactions between the behavior generating module 140, the model module 130 and the sensory processing module 120.

Once the model module 130 has received the plan from the behavior generator module 140, the model module can generate a predicted outcome based on the plan. The predicted outcome can be based on the models that are stored in a solid state or other memory devices associated with the model module. The predicted outcome based on the plan received by the behavior generator module 140 may then be sent to the sensor processing module 120 for a determination of whether any updates to the models are needed to ensure that the plan received from the behavior generator module 140 will be effective. Once the model module 130 receives any updates from the sensor processing module 120, the model module 130 may be configured to output the results to the judgment module 110. As will be discussed in further detail below, the judgment module may be configured to evaluate the plan proposed by the behavior generator module 140 to determine if the plan meets predetermined criteria. These predetermined criteria can be based on mathematical functions, including but not necessarily limited to a utility function.

If, based on the interaction between the sensor processing module 120 and the model module 130, a given model in the module is updated such that the plan is no longer acceptable, the value judgment module 110 may be configured to request another plan from the behavior generator module. According to one embodiment of the invention, however, the plan that is received into the value judgment module 110 need not be optimal. The plan only need meet a threshold limit of acceptability. Thus, the plan may be suboptimal, but may also be acceptable. Therefore, the cobot may report back to the requesting cobot with a plan that is acceptable based on predetermined criteria, but that plan may be too ineffective for the requesting cobot. Therefore, the receiving cobot 100 may need to perform the process again.

Figure 2:
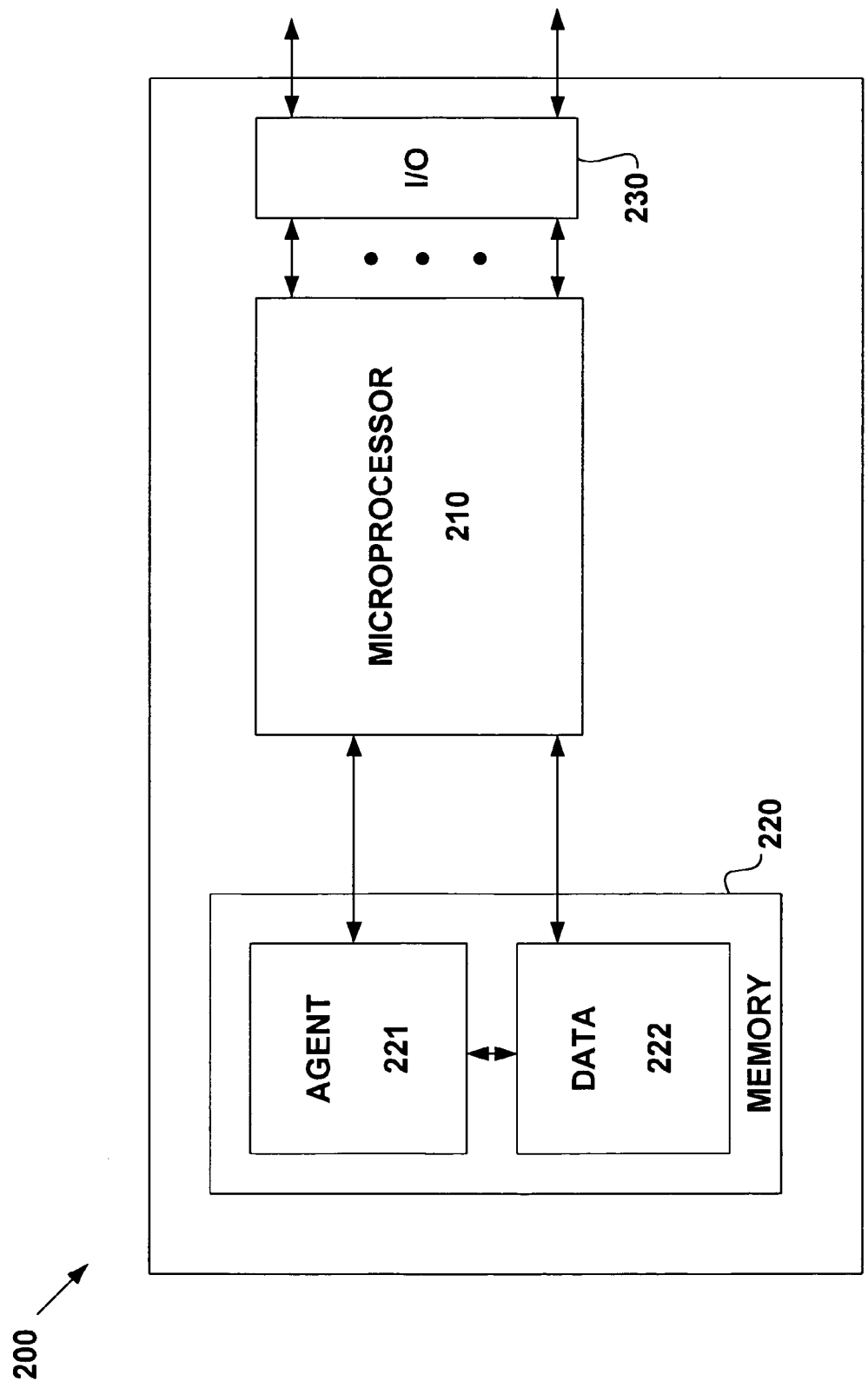
FIG. 2 shows a block diagram of a cobot according to an embodiment of the invention.

FIG. 2 shows a block diagram of a cobot according to an embodiment of the invention. As shown in FIG. 2, a cobot 200 may include a microprocessor 210. While a single microprocessor 210 is shown as being part of a single cobot 200, it should be understood that multiple cobots 200 may be configured to share a single microprocessor. Alternatively, a single cobot 200 may include a number of different microprocessors. As shown in FIG. 2, the microprocessor may be configured to interface with an input/output ("I/O") interface 230. The I/O interface may be configured to receive transmissions that are broadcast throughout the network from other modules or cobots. Moreover, the I/O interface may be configured to output a report to a requesting cobot. The report may include a forecasted outcome of implementing a chosen plan, for example. Additionally, the I/O interface 230 may be configured to output requests that are to be broadcast over the network of cobots.

The microprocessor 210 may also be configured to interface with a memory 220. The memory may include a software agent 221 that is to be implemented within the module. This software agent 221 may be configured to include the algorithms for performing the functions of the cobot module. In addition to software agent 221, memory 220 may include additional data 222 that is stored in the memory 220 based on, for example, successful solutions to problems, models and sensor data, for example.

Figure 3:
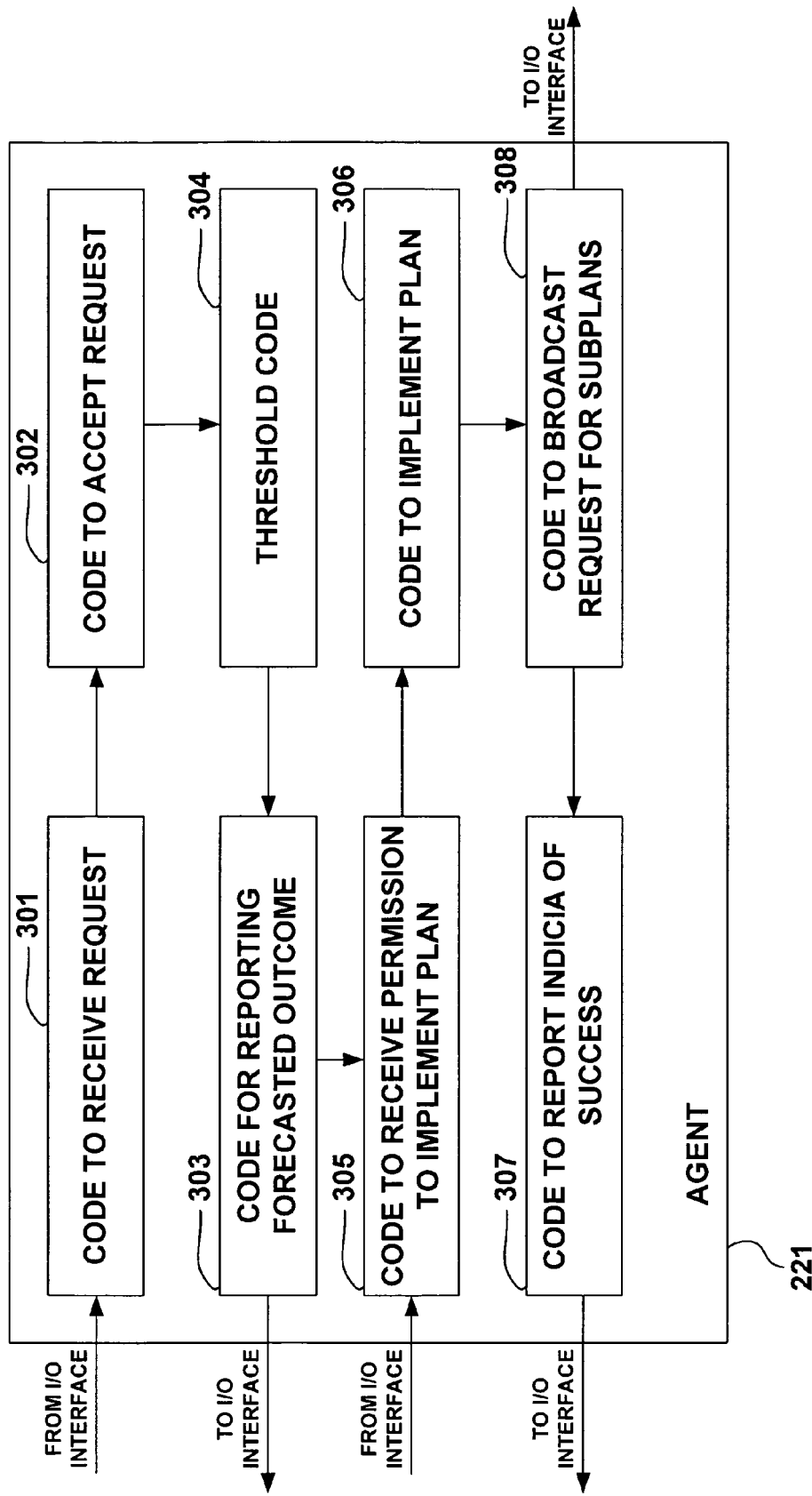
FIG. 3 shows a functional block diagram of an agent within a cobot according to an exemplary embodiment of the present invention.

FIG. 3 shows a functional block diagram of an agent within a cobot according to an exemplary embodiment of the present invention. The software agent 221 may include a number of different software algorithms and functionalities. As shown in FIG. 3, the software agent 221 may include code to receive a request 301. The request may be broadcast over a network of cobots. The request may be associated with a problem that is to be solved by the software agent 221. The software agent 221 may also include code to accept the request 302. The software agent 221 may also include code to determine if a particular solution to the problem meets a predetermined threshold 304. According to an exemplary embodiment of the present invention, the cobot may include a memory that includes a number of different solutions to a problem. These different solutions may produce different results based on the nature of the problem being solved and a number of different external or environmental factors. These external or environmental factors may be input into a cobot, for example, by a sensor input.

Once a particular solution is found to satisfy the predetermined threshold, the cobot may be configured to report the proposed solution and a forecasted outcome to the requesting cobot. Thus, the software agent 221 of the cobot may include code for reporting a forecasted outcome to the requesting cobot 303. Thus, the code for reporting the forecasted outcome to the requesting cobot may include software for transmitting the forecasted outcome to the I/O interface. After the forecasted outcome is reported to the requesting cobot by the code for reporting the forecasted outcome to the requesting cobot 303, the cobot may be configured to receive permission to implement the plan from the requesting cobot. Thus, the cobot may include code to receive permission to implement the plan 305 from the requesting cobot. The code to receive permission to implement the plan may be configured to receive data from the I/O interface in the cobot.

The cobot may also include code to implement the plan 306. Thus, the cobot may be configured to implement the plan once permission to implement the plan has been received from the requesting cobot. According to an exemplary embodiment of the present invention, the cobot may include code to broadcast a request for subplans. According to this embodiment of the invention, the cobot may determine, during the implementation of a plan, that the plan cannot be carried out without having another cobot in the network perform a particular subplan. If the cobot determines that a subplan is necessary, it may be configured to broadcast a request to the other cobots in the cogbot. While the plan is being carried out, another cobot may, if permission is received from the requesting cobot, be implementing the subplan. Once all subplans have been completed, the cobot 221 may be configured to report an indicia of success to the requesting cobot. Thus, the cobot 221 may include code to report an indicia of success 307 to the requesting cobot. The code to report an indicia of success 307 may include code to output data via the I/O interface.

Figure 4:
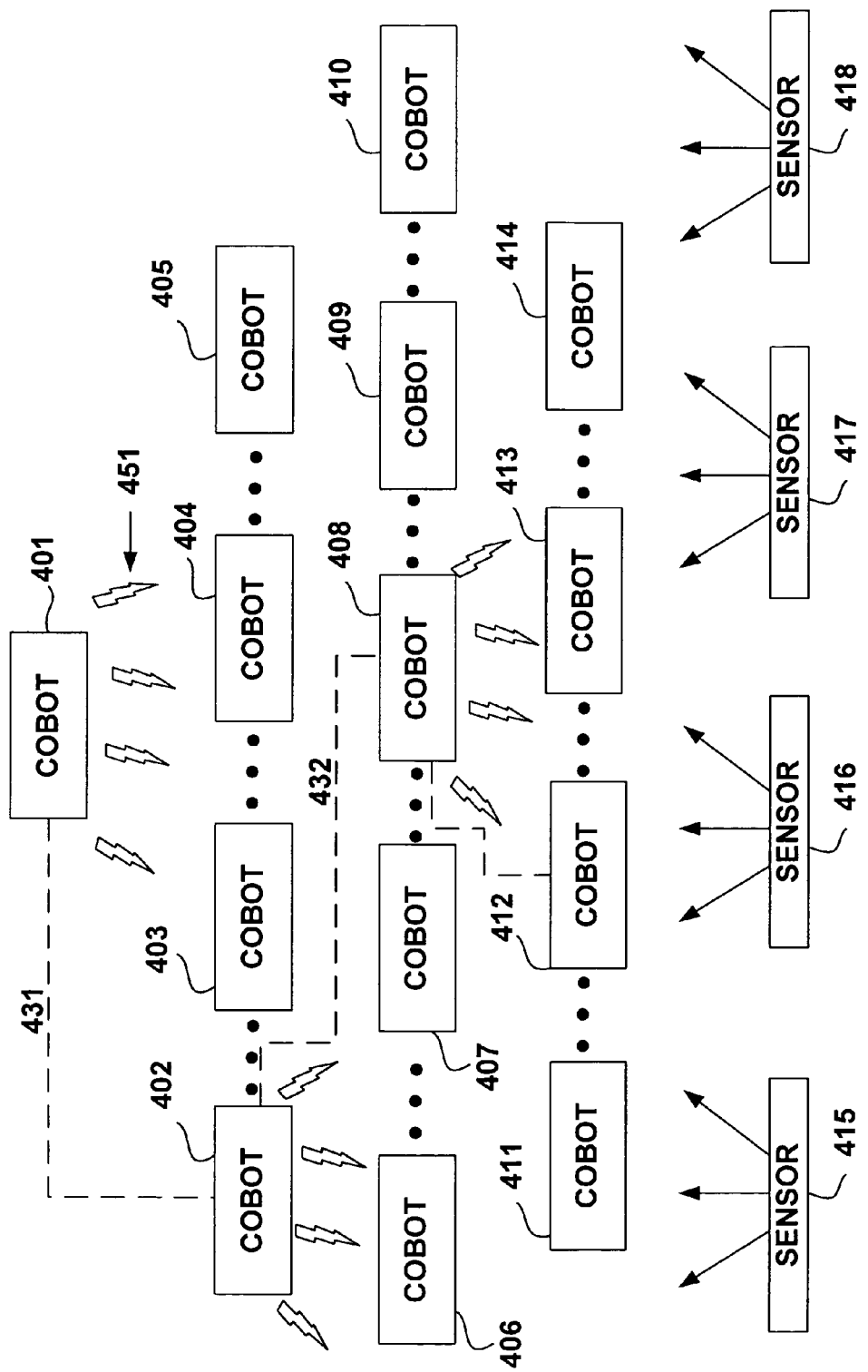
FIG. 4 shows an exemplary network of cobots according to the present invention.

FIG. 4 shows an exemplary network of cobots according to the present invention. A network of cobots, or a cogbot, may include a number of cobots 401-414. These cobots may be configured such that they may communicate with one another. While the cobots 401-414 may be coupled to one another via a communications bus, any form of communications between the cobots may be performed, such as wireless communications, or any other acceptable form of communication of data between modules. The cogbot may also include a number of sensors 415-418. These sensors may be configured to sense external or environmental conditions and may provide the sensed information to the network of cobots so that the cobots may update any models associated with the particular cobot. Some exemplary sensors include, for example, location sensors (e.g., GPS), temperature sensors, light sensors, directional sensors (which may or may not be part of a GPS system), visual sensors, to name a few. The type of sensors that may be used in connection with a particular cobot may be determined based on the particular purpose of the cobot and the network of cobots.

The operation of a cogbot will now be described. Cobot 401 may be configured to receive a request that is input into the cogbot. The request may be associated with a particular problem that needs to be solved. The receiving cobot 401 may be configured to analyze the input problem to determine what steps need to be performed to solve the problem. According to an exemplary embodiment of the present invention, the cobot 401 may be configured to determine whether or not the cogbot can provide a plan and implement a plan that can solve the problem associated with the request. In the event that the cogbot shown in FIG. 4 cannot solve the problem associated with the request, then an error message may be returned to, for example, an end user. Alternatively, the error message may be output to another cogbot that provided the request to the cogbot shown in FIG. 4.

If the receiving cobot determines that the request can be processed by the cogbot and that the cogbot may be able to determine and implement a plan to solve the problem associated with the request, cobot 401 may broadcast a request 451 for subplans to provide a solution based on the problem associated with the request. In the exemplary embodiment of the invention illustrated in FIG. 4, cobot 402 may be configured to determine that it may be configured to provide a plan to solve the problem associated with the request 451 broadcast from cobot 401. Cobot 402 may be configured to select a plan that may solve the problem associated with the request 451. Once a plan has been determined to be an acceptable solution to the problem, cobot 402 may be configured to report to cobot 401 along communication path 431.

According to the exemplary embodiment of the invention shown in FIG. 4 cobot 402 may determine that additional subplans are needed to complete the plan determined by cobot 402. Cobot 402, therefore, may broadcast a request on the network of cobots. As shown in FIG. 4, cobot 408 may be configured to receive the request from the requesting cobot 402. Cobot 408 may determine that it can provide the relevant subplan to solve the problem associated with the request from cobot 402 along communication path 432. Cobot 408 may determine that to implement the subplan, an additional subplan is required. Cobot 408 may broadcast a request over the network in an attempt to locate a cobot that can provide the additional subplan(s). The request broadcast by cobot 408 may be accepted by, for example, cobot 412. Cobot 412 may be configured to provide a plan that is acceptable to solve the particular problem associated with the request that is broadcasted across the network back to the requesting cobot 408.

If cobot 412 receives permission to implement the acceptable plan by the requesting cobot 408, an indicia of success may be provided to the requesting cobot 408 when the plan has been implemented. Once the subplans have been provided to cobot 408 and cobot 408 has implemented its applicable plan, cobot 408 may be configured to report an indicia of success to cobot 402. This same pattern may be configured to repeat until cobot 401 receives the applicable responses from all of the cobots in the network that had accepted requests from other cobots in the network.

Figure 5:
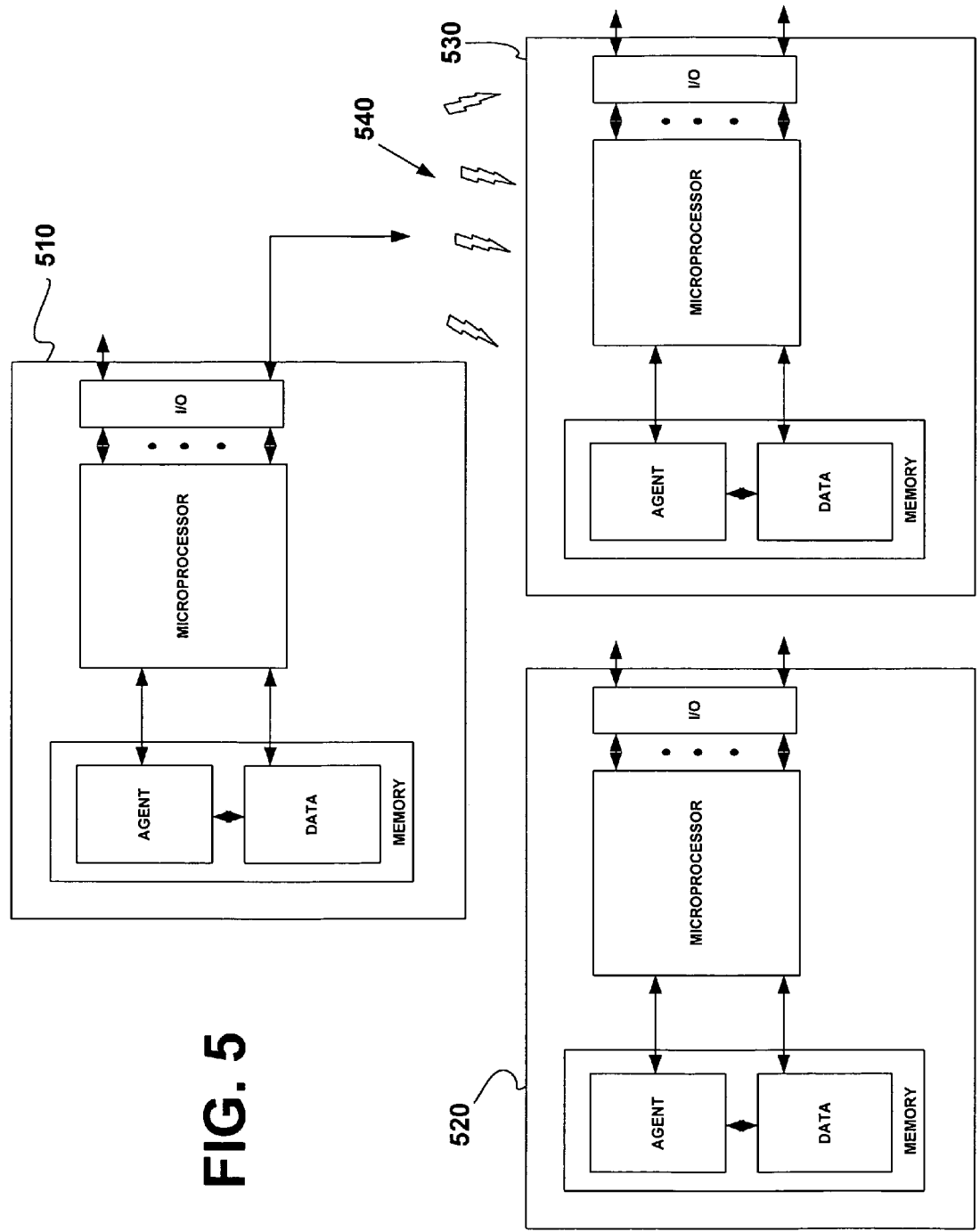
FIG. 5 shows another exemplary network of cobots according to the present invention.

FIG. 5 shows another exemplary network of cobots according to the present invention. As shown in FIG. 5, a requesting cobot 510 may be configured to broadcast a request 540 over a network of cobots. As shown in FIG. 5, each cobot 510, 520 and 530 may be configured to include a memory, microprocessor, and an I/O interface, as was previously described with respect to FIG. 2.

Figure 6:
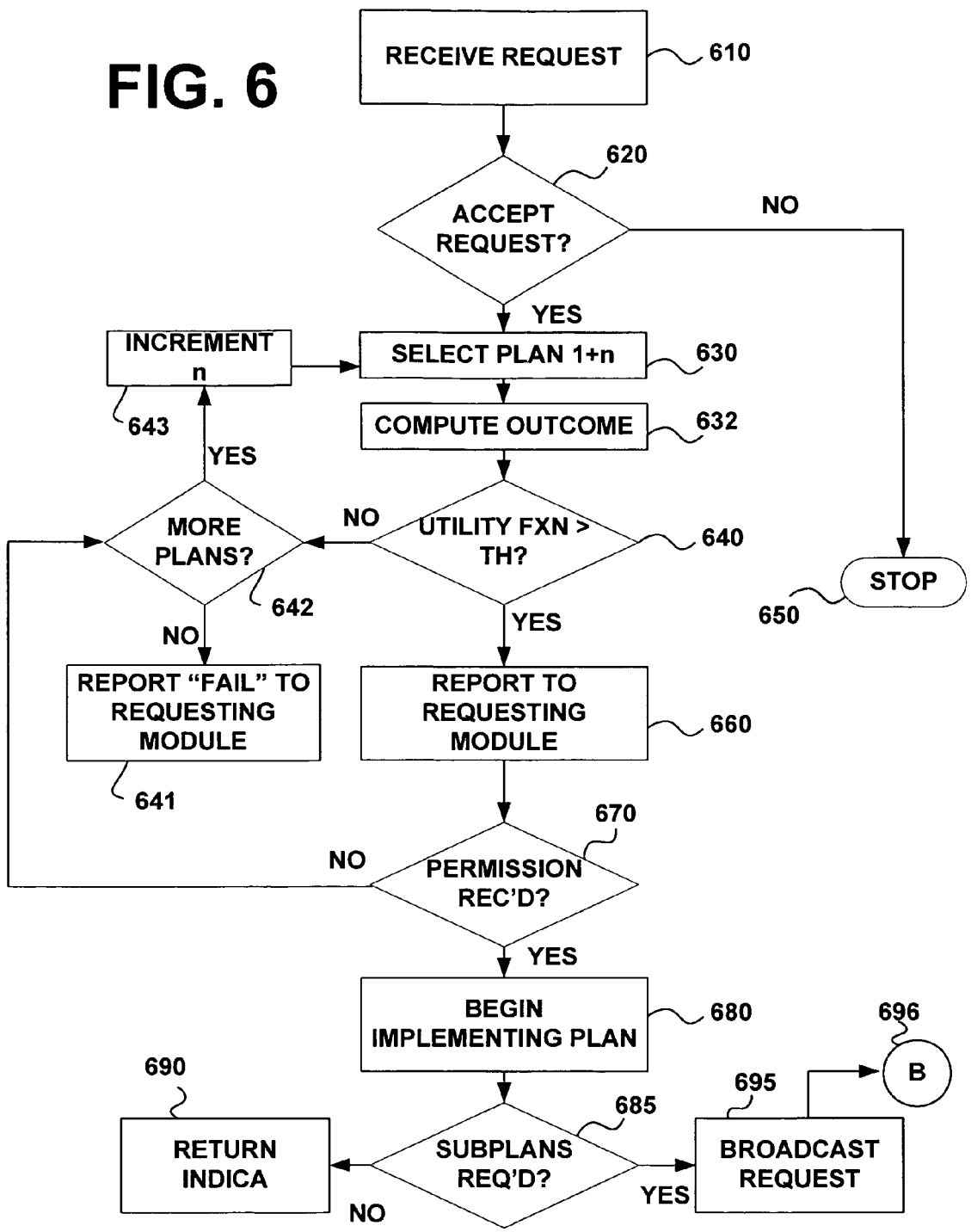
FIGS. 6 and 7 show exemplary flow charts of a process that can be carried out by a cobot according to an exemplary embodiment of the present invention.
Figure 7:
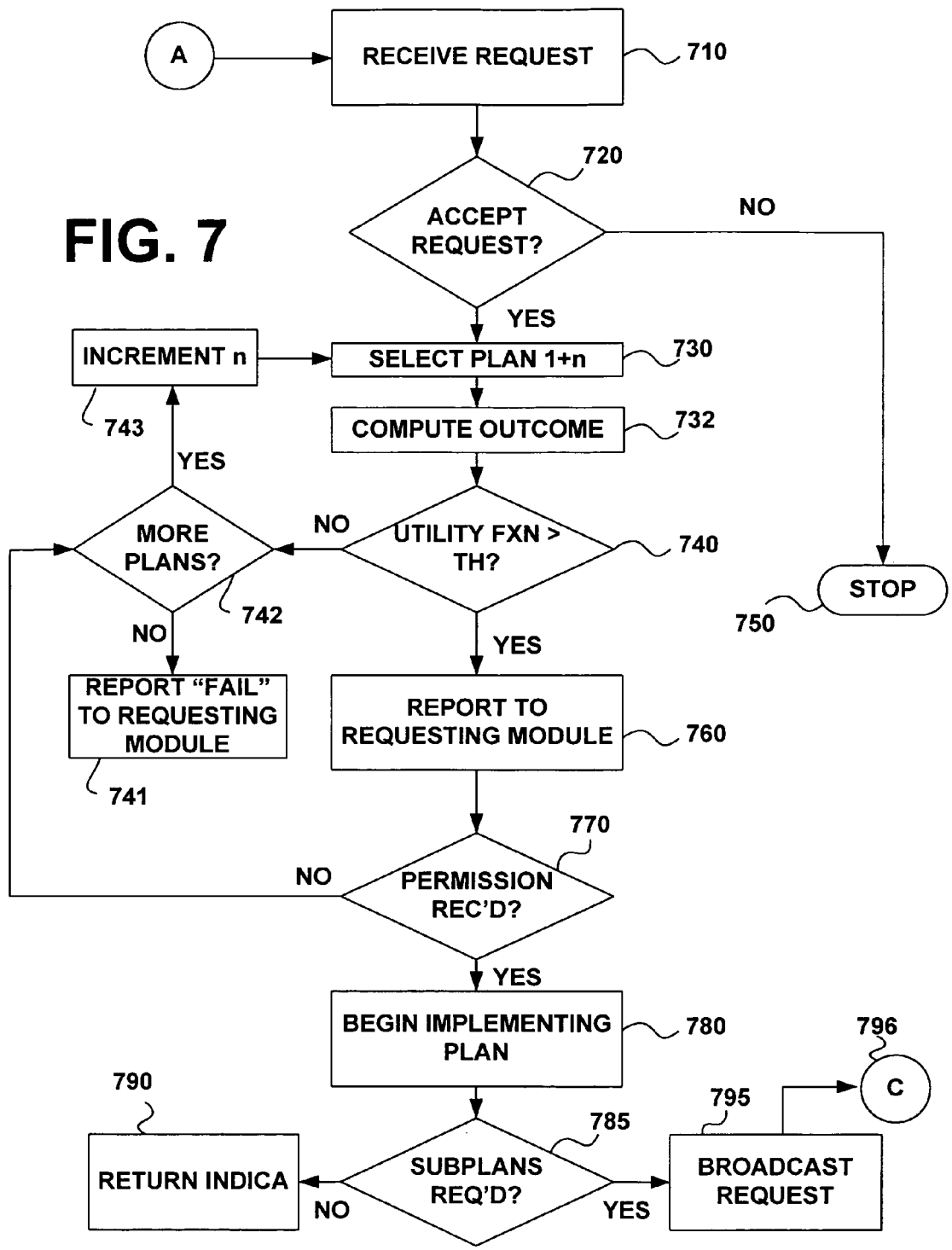

FIGS. 6 and 7 show exemplary flow charts of a process that can be carried out by a cobot according to an exemplary embodiment of the present invention. As shown in FIG. 6, a cobot may receive a request, step 610. After the request has been received, the cobot may determine whether or not to accept the request as indicated in decision block 620. Whether or not the request is accepted may be dependent on whether or not the problem associated with the request is correlated with an applicability function. According to an exemplary embodiment of the invention, a cobot may be configured to match a request solely with the cobot's functionality and for which resources the cobot is configured to plan. Each cobot may further be configured to qualify a request with an applicability function. This applicability function may be configured to integrate sensed information in block 950 of FIG. 9, for example, to determine if the cobot may be used. Applicability functions may be configured to indicate a degree of confidence associated with the cobot's model and a degree of appropriateness based on the request and the problem associated with the request. If the request is not accepted, then the cobot's algorithm may be stopped as shown by termination 650. If the request is accepted, a plan may be selected 630. According to one embodiment, the plans may be listed in a predetermined order and a plan n=0 may be selected. While a type of a counter is used to select particular plans, it should be understood that this is just one way of determining which plans to select to determine if they meet a threshold level of utility for a particular function. For example, according to an exemplary embodiment of the present invention, the plans may be reordered based on previous success in addressing a particular request. Therefore, the list may be configured to be dynamically updated to improve the processing speed of the system. After the plan has been selected, an outcome may be computed, step 632. This outcome may be computed, step 632, based on any function that can asses or weight the result and convert that into a quantity. The particular function that is used in connection with the computation of the outcome step 632 is not critical to the present invention. The cobot may be configured to determine if a utility function is greater than a threshold ("TH") as illustrated by decision block 640.

If the cobot determines that the value of the utility function with a particular plan does not meet the predetermined threshold, then the cobot may be configured to determine if there are any more plans as indicated by decision block 642. According to one exemplary embodiment of the invention in which a counter is used, the more plans decision may be based on comparing a value associated with the number of the plan to a number of total plans. If the number associated with the particular plan is equal to the number of total plans, then an indicia of failure may be returned to the requesting cobot or module, step 641. If the cobot determines that there are more plans available at decision block 642, then, according to an exemplary embodiment of the invention, n may be incremented, step 643, and the next plan may be selected 630 and the loop may repeat. This loop will repeat until either there are no more plans or one of the plans meets a threshold level of utility as indicated in decision block 640. As can be seen from FIG. 6, the particular plan need not be the best plan to solve a particular problem, it only need be a satisfactory plan (i.e., it must meet the threshold level of utility).

Once a plan has been determined to meet a threshold level of utility, the cobot may be configured to report this to the requesting cobot, step 660. The report to the requesting cobot may be made using a particular protocol. This protocol may include a header including an identifier uniquely associated with the requesting cobot and a field including data related to the request and the problem to be solved. Thus, the receiving and accepting cobot may know, based on packets of data received using the protocol, which cobot to report back to. Once the receiving cobot has reported back to the requesting cobot, step 660, the cobot will wait to receive permission to implement the plan from the requesting cobot. As shown in FIG. 6 as decision block 670, if the cobot receives a denial of permission to implement the plan from the requesting cobot, the cobot will determine if there are any more plans left as indicated by decision block 642. If the cobot determines that there are additional plans left, according to an exemplary embodiment of the invention, the value of n may be incremented, step 643, and the next plan may be analyzed to determine whether or not it satisfies the threshold level of utility, decision 640.

If permission to implement the plan is received, decision block 670, the cobot may begin implementing the plan, step 680. While implementing the plan, the cobot may be configured to determine whether or not any subplans will be required to implement the plan, as indicated by decision block 685. If the cobot determines that there are no subplans required to implement the plan, then, once the cobot has completed implementing the plan, step 680, the cobot may be configured to return an indicia of success or failure to the requesting cobot, step 690. As described above, the cobot may be configured to utilize a specialized protocol so that the indicia may be returned to the appropriate requesting cobot. If, however, subplans are required, as indicated by decision block 685, then a request may be broadcast over the network of cobots, step 695, to locate a cobot that can select and implement a particular subplan. Once the request is broadcast, this process may repeat itself as will be indicated by "B", 696, which represents the input into the flow chart depicted in FIG. 7.

As shown in FIG. 7, after cobot "A" (FIG. 6) broadcasts a request to the other cobots in the network, another cobot may be configured to receive that request, step 710. After the request has been received, the cobot may be configured to determine whether or not to accept the request as indicated in decision block 720. Whether or not the request is accepted may be dependent on whether or not the problem associated with the request is correlated with an applicability function as discussed in additional detail with respect to FIG. 6. If the request is not accepted, then the cobot's algorithm may be stopped as shown by termination 750. If the request is accepted, a plan may be selected 730. As discussed above with respect to FIG. 6, according to one embodiment, the plans may be listed in a predetermined order and a plan n=0 may be selected. While a type of counter is used to select particular plans as shown in FIG. 7, it should be understood that this is just one method for determining which plan to select to determine if they meet a threshold level of utility for a particular function. According to an alternative embodiment, the plans may be dynamically reordered based on previous success in addressing a particular request. This reordering of the plans may be based on a success ratio or a score that becomes associated with a particular plan once it has been successfully implemented. Plans that are not determined to be successful may receive a lower score. Therefore, the list may be configured to be dynamically updated to improve the processing speed of the system and reduce the chances that the cobot will use plans known not to meet a utility function before using plans that are more likely to produce a threshold level of utility.

After the plan has been selected, an outcome may be computed, step 732. An outcome may represent an expectation about the future state of the cobot's model or how the problem has change once the plan is applied. An outcome may contain aspects of the problem not explicit in the request (e.g., fuel consumption associated with the movement of, for example a vehicle, time elapsed in performing a function, or health). This outcome may be computed, step 732, based on any function that can asses or weight the result and convert that into a quantity. The particular function that is used in connection with the computation of the outcome step 732 is not critical to the present invention. The cobot may be configured to determine if a utility function applied to the outcome is greater than a threshold ("TH") as illustrated by decision block 740.

If the cobot determines that the value of the utility function with a particular plan does not meet the predetermined threshold, then the cobot may be configured to determine if there are any more plans as indicated by decision block 742. According to one exemplary embodiment of the invention in which a counter is used to select a particular plan, the more plans decision 742 may be based on comparing a value associated with the number of the plan to a number of total plans. If the number associated with the particular plan is equal to the number of total plans, then an indicia of failure may be returned to the requesting cobot or module, step 741. If the cobot determines that there are more plans available at decision block 742, then, according to an exemplary embodiment of the invention, n may be incremented, step 743, and the next plan may be selected 730 and the loop may repeat. This loop will repeat until either there are no more plans or one of the plans meets a threshold level of utility as indicated in decision block 740. As can be seen from FIG. 7, the particular plan need not be the best plan to solve a particular problem, it only need be a satisfactory plan (i.e., it must meet the threshold level of utility).

Once a plan has been determined to meet a threshold level of utility, the cobot may be configured to report this to the requesting cobot, step 760. The report to the requesting cobot may be made using a particular protocol. This protocol may include a header including an identifier uniquely associated with the requesting cobot and a field including data related to the request and the problem to be solved. Thus, the receiving and accepting cobot may know, based on packets of data received using the protocol, which cobot to report back to. Once the receiving cobot has reported back to the requesting cobot, step 760, the cobot will wait to receive permission to implement the plan from the requesting cobot. As shown in FIG. 7 as decision block 770, if the cobot receives a denial of permission to implement the plan from the requesting cobot, the cobot will determine if there are any more plans left as indicated by decision block 742. If the cobot determines that there are additional plans left, according to an exemplary embodiment of the invention, the value of n may be incremented, step 743, and the next plan may be analyzed to determine whether or not it satisfies the threshold level of utility, decision 740.

If permission to implement the plan is received, decision block 770, the cobot may begin implementing the plan, step 780. While implementing the plan, the cobot may be configured to determine whether or not any subplans will be required to implement the plan, as indicated by decision block 7. If the cobot determines that there are no subplans required to implement the plan, then, once the cobot has completed implementing the plan, step 780, the cobot may be configured to return an indicia of success or failure to the requesting cobot, step 790. As described above, the cobot may be configured to utilize a specialized protocol so that the indicia may be returned to the appropriate requesting cobot. If, however, subplans are required, as indicated by decision block 785, then a request may be broadcast over the network of cobots, step 795, to locate a cobot that can select and implement a particular subplan. Once the request is broadcast, this process may repeat itself as will be indicated by "C", 796. It should be understood that, in many cases, in order to solve a particular problem, there may be numerous iterations of this process occurring at a number of different cobots within the network of cobots. There could be tens, hundreds, thousands, or more cobots in a particular network and these cobots may be configured to provide and implement a plan to solve only a discrete portion of the overall problem. Therefore, to increase simplicity and reduce redundancy in the present disclosure only two exemplary flow charts are shown. It should be understood that there are many similar processes being run on other cobots within the network.

Figure 8:
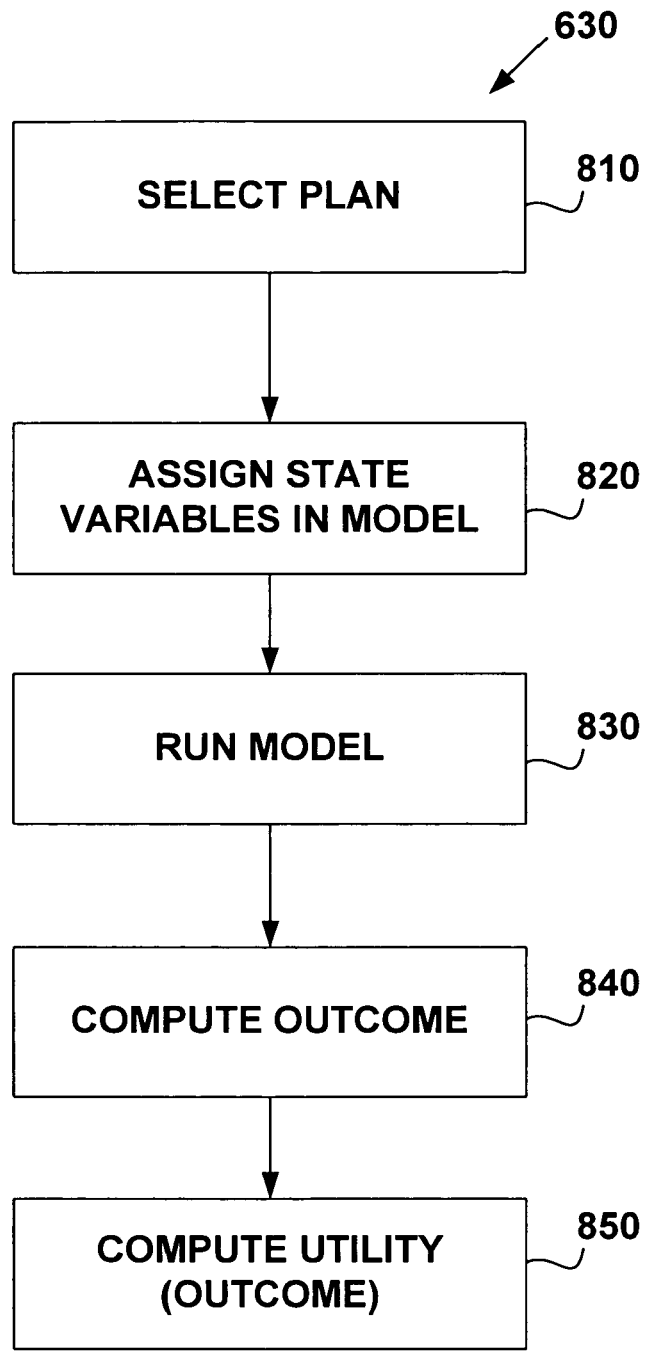
FIG. 8 shows a flow chart of a plan selection algorithm according to an exemplary embodiment of the present invention.

FIG. 8 shows a flow chart of a plan selection algorithm according to an exemplary embodiment of the present invention. FIG. 8 shows steps that may be performed within the "select plan n+1" block 630 or its equivalent (i.e., in embodiments that do not use a counter to select the next plan). According to this embodiment of the invention, the cobot may be configured to select a plan based on any acceptable methodology, e.g., a counter, a scoring system, randomly, etc., step 810, and may be configured to assign state variables in a model. The state variables are variables that may represent an external or environmental state and are used by the cobot to model the problem. The external state may be a physical or a conceptual state. Examples of physical states include measurable quantities such as location, time, temperature, etc., while conceptual states may include happiness, political unrest, or any other conceptual parameter. These conceptual parameters may be quantified by using one or more functions including one or more physical parameters that are input into a model to provide a quantification of the conceptual parameter. Thus, conceptual states may be determined based on transformations that may take place in, for example, the belief module or in the model itself, for example. These state variables may be based, at least in part on sensor data provided by sensors that provide input into the cobot either directly, via the I/O interface, or indirectly via other cobots or via some other communications channel. These state variables may also be implied by the request to the cobot. An implied state variable may include a variable that is the natural consequence of implementing a plan or a particular aspect of a plan. This may be, for example, the consumption of fuel due to the movement of a plane, a ship, or a vehicle.

After the cobot has assigned the state variables in the model within the memory associated with the cobot, step 820, the model may be run, step 830. Based on the model being run, the outcome may be computed, step 840. An example of assigning state variables to a "move-to" request may be to assign the x,y,z state variables to the beginning position and the time variable to the starting time. The model is a method of using a processor which determines the outcome of a plan. Examples of models may include a physics abstraction, a social abstraction, or a financial abstraction. When a plan is input into a model the model may be configured to calculate in one or more arithmetic operation and/or logical operations the outcome or result of the plan accounting for state variable effects. An example of "walking in the rain" may result in a wet person at a new desired location. Another example, may be a ball starting at x=0, y=0, z=0 at a time t=0 moving in the x-y plane. This may translate to an outcome of x=3, y=5, z=0 at a time t=4 seconds. A utility function may be calculated for the outcome which represents its "goodness" or benefit according to the cobot. For example, the cobot may have been requested to direct the ball to y=6 with a utility function of Y(final)/|Y(goal)-y(start)|. In this example, the utility of the outcome is 5/6, or 0.8333. After the outcome has been computed, step 840, the utility of the outcome may be computed, step 850. This utility function may then be compared to a threshold level of utility as shown in FIGS. 6 and 7. Step 840, computing the outcome, is often different than step 850, computing utility, because utility is unitless and a "goodness" or benefit measure, whereas outcome can be expressed in a predetermined measurement unit, such as feet, meters, seconds, or gallons, to name a few. Any measurement unit may be included.

Figure 9:
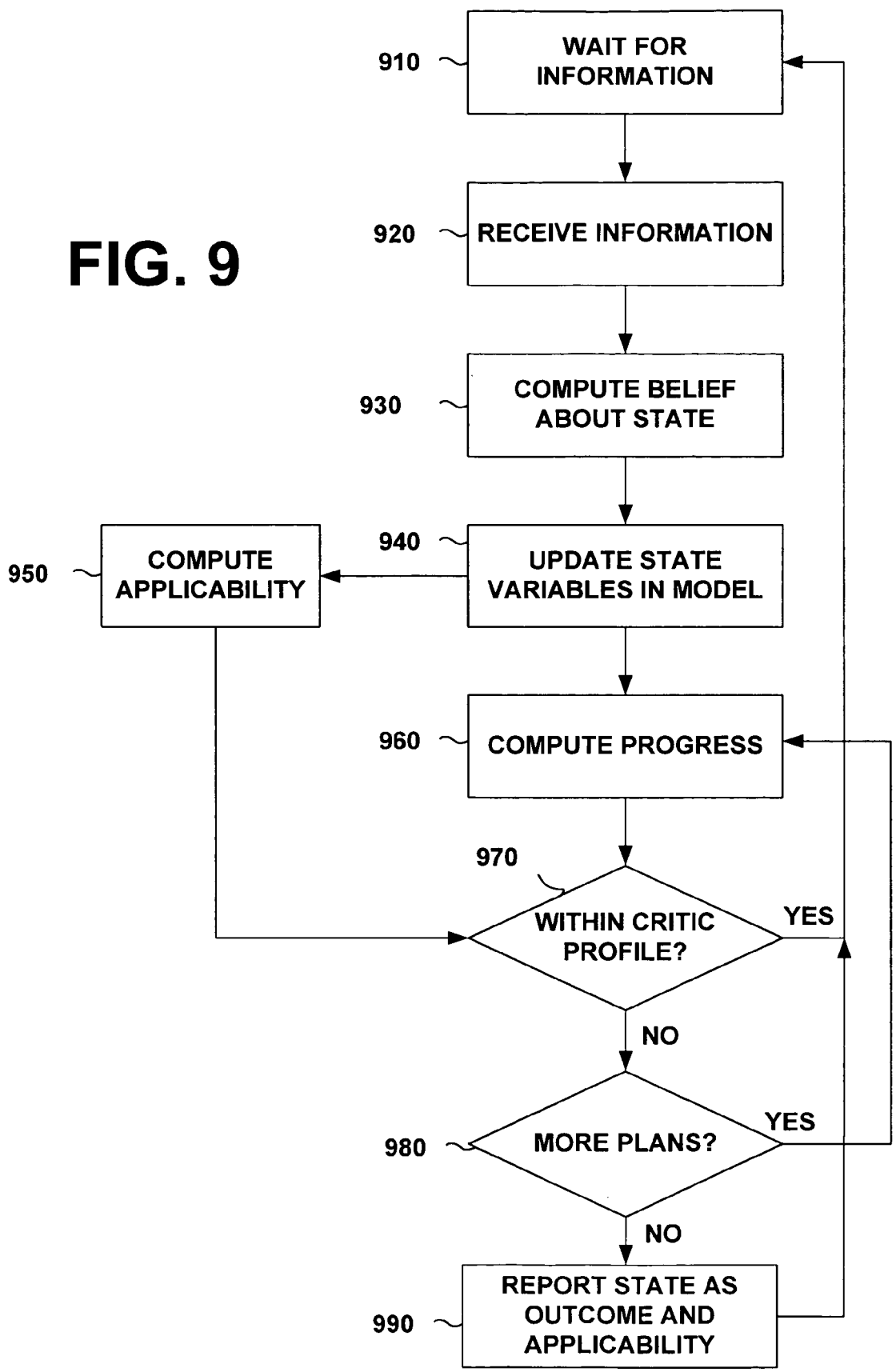
FIG. 9 shows an exemplary embodiment of an algorithm for selecting a plan for implementation.

FIG. 9 shows an exemplary embodiment of an algorithm for updating a model with information about a plan that is being implemented. The activities in FIG. 9 may be performed concurrently with the steps shown in FIGS. 6 and 7. As a plan is being implemented, each cobot may be configured to await information step 910. When the information is received, step 920, it may be interpreted or converted into state variables for the model, step 930. This step is referred to in FIG. 9 as including "belief" because it is not guaranteed to be accurate. These belief(s) may be used to change the model's expected outcomes into measured outcomes, step 940. This information may be used to calculate how applicable continuing to use the cobot is in step 950. After the model is updated a believable current outcome is computed in step 960. After the model is updated a believable current outcome is compared with the critic function's expected outcome as per step 970. If "yes" then according to an exemplary embodiment of the invention, the cobot's algorithm may be configured to loop back and wait to receive additional information, step 910. If, not within the critic function, then the cobot will determine if there are any additional plans remaining, decision 980. If the answer to this is "no," then the cobot may be configured to report the state outcomes and its applicability in step 990. Moreover, the cobot may be configured to loop back and await the arrival of additional information, step 910. If there are additional plans remaining, the cobot may be configured to loop back and compute the progress, step 960.

Figure 10:
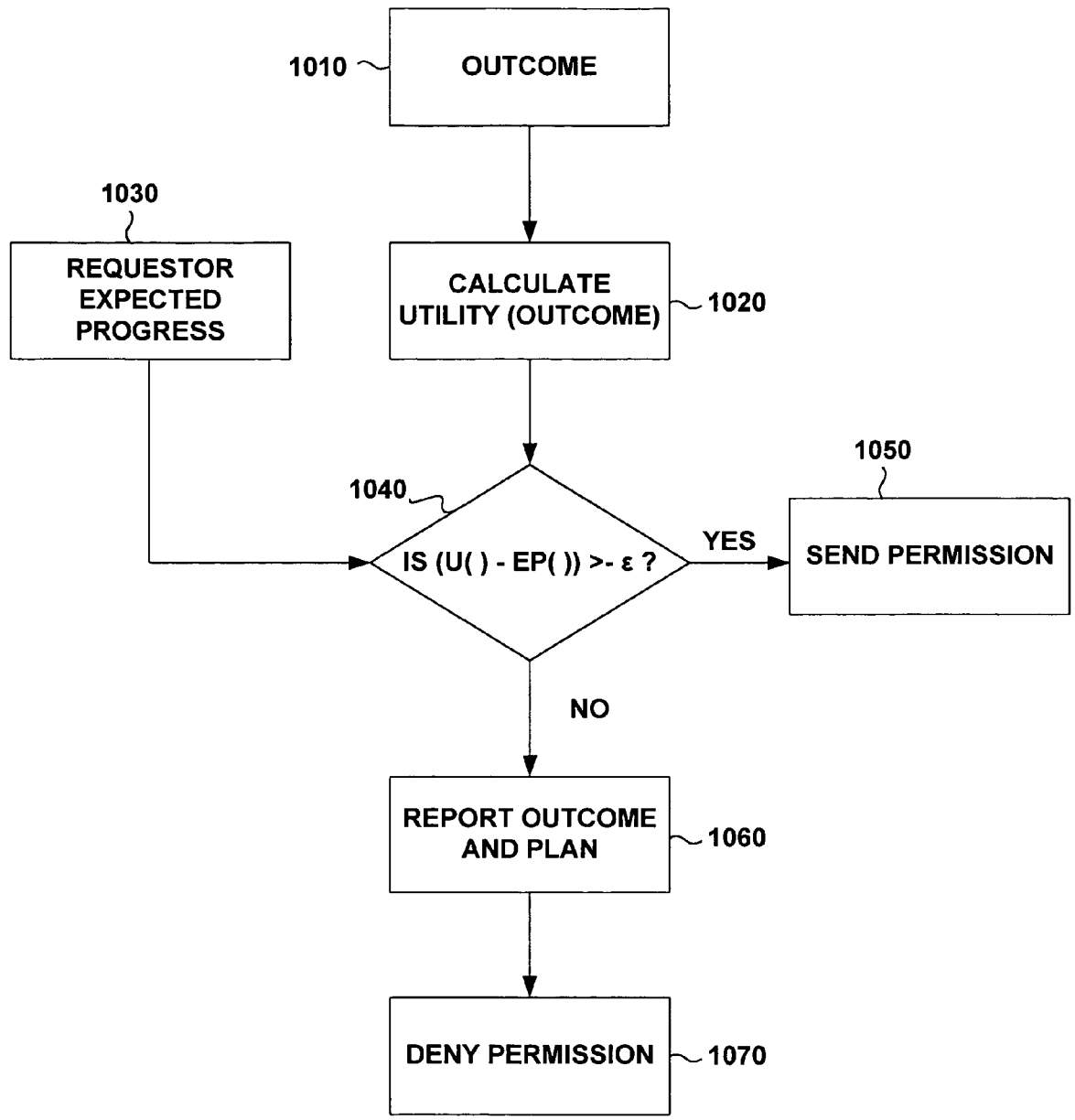
FIG. 10 shows an exemplary embodiment of an algorithm for determining whether or not to grant permission to a responding cobot based on a plan that is reported to a requesting cobot.

FIG. 10 shows an exemplary embodiment of an algorithm for determining whether or not to grant permission to a responding cobot based on a plan that is reported to a requesting cobot. As shown in FIG. 10, a requesting cobot may be configured to receive a reported outcome from a receiving cobot elsewhere in the cogbot, step 1010. Once the requesting cobot has received the outcome associated with a proposed plan to be implemented by the receiving cobot, step 1010, the requesting cobot may be configured to calculate a utility associated with the plan proposed by the receiving cobot, step 1020. Once the utility function has been calculated based on the proposed plan from the receiving cobot, step 1020, the requesting cobot may be configured to determine if the plan fits into its overall plan to solve the problem that it was presented with, as indicated by decision block 1040. Thus, as shown in decision block 1040, the cobot may be configured to determine if the inequality $|U(\ )-EP(\ )|>-\epsilon$ is satisfied. In this equation $U(\ )$ represents the calculated utility based on the outcome received. EP represents the utility base don the expected stage of the plan being implemented. $\epsilon$ is an amount of variance or error rate that is ignorable and often associated with measurement error. Thus, the actual utility should be at least as good as what is expected according to this exemplary implementation of the present invention. If this inequality is satisfied, the requesting cobot may be configured to send permission to the responding cobot to implement the plan, step 1050.

If, however, the inequality in decision block 1040 is not satisfied, then the outcome and plan may be reported to the cobot that made a request for a plan on the requesting cobot (i.e., a report back up the chain of command in the cogbot), step may then transmit a denial of permission to implement the plan back to the receiving cobot, step 1070. This may cause the receiving cobot to determine if there are any other plans that may be used to satisfy the request from the requesting cobot, as was described with respect to FIGS. 6 and 7.

Figure 11:
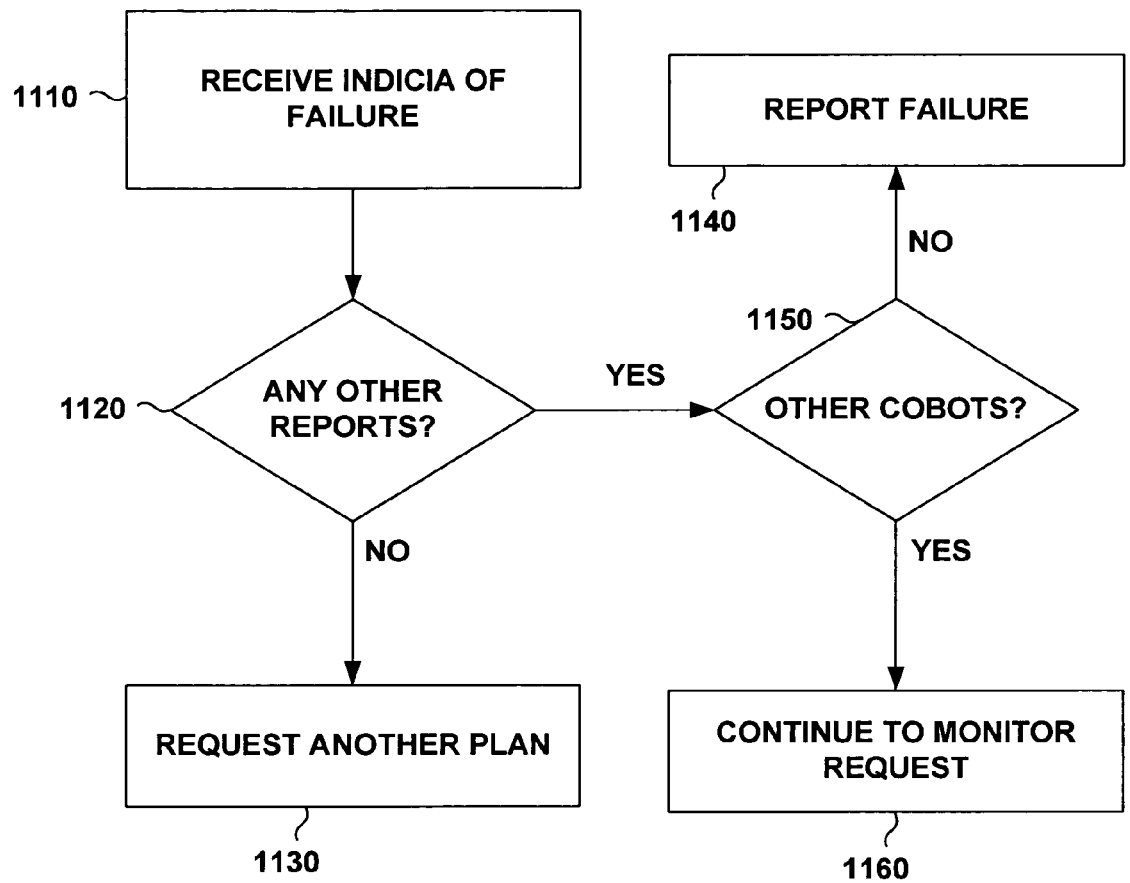
FIG. 11 is an exemplary embodiment of an algorithm that may be performed by a requesting cobot when a planning cobot reports an inability to generate a plan according to the current request.

FIG. 11 is an exemplary embodiment of an algorithm that may be performed by a requesting cobot when an indicia of failure is received. As shown in FIG. 11, after receiving an indicia of failure, step 1110, the requesting cobot may be configured to determine if it has received any other reports from other cobots in the network, as indicated by decision block 1120. If no other reports have been transmitted back to the requesting cobot, then the requesting cobot may be configured to broadcast another request to other cobots on the network, step 1130. If there are any other reports, then the requesting cobot may be configured to determine if there are any other cobots on the network that have responded as indicated by decision block 1150. If there are no additional cobots on the network, then the requesting cobot may be configured to report a failure to the cobot that has made the request upon it, step 1140, for example. Alternatively, where the requesting cobot is the first cobot on the network an error message may be returned to, for example, an end user or another computer program that may be utilizing the cobot. If there are additional cobots on the network, the requesting cobot may be configured to monitor the requests that it has made to the other cobots, step 1160.

Numerous other configurations of a network including processor-readable software modules and associated methods for problem solving using such software modules may be implemented based on the present disclosure. While the invention has been described with reference to specific embodiments, it is not intended to be limited to these embodiments. The invention may be modified or varied in many ways and such modifications and variations as would be obvious to one of skill in the art are within the scope and spirit of the invention and are included within the scope of the following claims.

What is claimed is:

1. Processor-readable software code stored on a processor-readable medium, the code comprising code to:
receive a first request from a cobot, the request being associated with a discrete problem and being broadcast over a network of cobots;
accept the request based on the discrete problem to be solved;
determine whether a utility function associated with a plan to solve the discrete problem meets a threshold, the plan including a plurality of steps;
report to the requesting cobot the forecasted outcome of the chosen plan;
receive permission to implement the chosen plan;
implement the plan before any subplans are known or determined to be possible;
broadcast a second request to a plurality of other cobots in the network to implement any necessary subplans; and
return an indicia of success to the cobot sending the first request when an implementing cobot in a network of cobots has obtained a desired outcome for the cobot broadcasting the second request.

2. The processor-readable software code of claim 1, wherein the code to accept the request includes code to implement an applicability function for determining if the receiving cobot can solve the discrete problem.

3. The processor-readable software code of claim 1, wherein the code to determine whether a utility function associated with the plan to solve the discrete problem meets a threshold is based on a confidence score.

4. The processor-readable software code of claim 1, wherein the code to determine whether a utility function associated with the discrete problem meets a threshold includes implementing at least two of a critic function, a goal function, and an applicability function.

5. The processor-readable software code of claim 4, wherein the critic function is configured to determine a status of the plan based on a predetermined schedule uniquely associated with that plan.

6. The processor-readable software code of claim 4, wherein the critic function is configured to report to the cobot sending the first request when the implementation of the plan is ahead of a predetermined schedule uniquely associated with the plan.

7. The processor-readable software code of claim 1, further comprising code to monitor status of the implemented plan based on a schedule uniquely associated with the chosen plan.

8. The processor-readable software code of claim 1, wherein the first request is transmitted using a cobot protocol, the cobot protocol including a unique identifier associated with the cobot sending the first request and a task value string associated with the discrete problem.

9. The code of claim 1, wherein said threshold is non-zero parameter that represents at least a partial performance of the utility function, such that said determine step determines whether the utility function can be performed to an en extent that exceeds the at least a partial performance.

10. The code of claim 1, further comprising said report functionality precedes said receive functionality, and said implement functionality follows said receive functionality.

11. The network of claim 1, further comprising said report functionality precedes said receive functionality, and said implement functionality follows said receive functionality.

12. A network of modules, the modules being stored on a processor-readable medium and being embodied as processor-readable software code the network comprising:
a first cobot module, the first cobot module being configured to:
receive input data associated with a problem to be solved;
broadcast a first request to the network of modules, the first request being based on the input data associated with the problem to be solved;
a second cobot module, the second cobot module being configured to:
receive the first request from the first cobot module;
accept the request from the first cobot module;
determine whether a utility function associated with a plan to solve the discrete problem meets a threshold, the plan including a plurality of steps;
report to the first cobot module the forecasted outcome of the chosen plan;
receive permission to implement the chosen plan; and
implement the plan before any subplans are known or determined to be possible.

13. The network of modules according to claim 12, wherein the second cobot module is configured to broadcast a second request to the network of modules, the second request being associated with a subproblem associated with the plan implemented by the second cobot.

14. The network of modules according to claim 13, further comprising: a third cobot module, the third cobot module being configured to: receive the second request from the second cobot module; accept the request from the second cobot module; determine whether a utility function associated with a subplan to solve the subproblem meets a threshold, the subplan including a plurality of steps; report to the second cobot module the forecasted outcome of the chosen subplan; receive permission to implement the chosen subplan; and implement the subplan before any further subplans are known or determined to be possible.

15. The network of modules according to claim 14, wherein the second cobot module is configured to return an indicia of success to the first cobot module when all subplans have been returned to the second cobot module.

16. The network of modules according to claim 12, wherein the first cobot module is configured to broadcast the request using a protocol, the protocol including an identifier uniquely associated with the first cobot and a task value string associated with the problem.

17. The network of modules according to claim 12, wherein the second cobot module is configured to accept the request based on an applicability function, the applicability function being configured to identify whether the second cobot module can solve the problem based on the request received from the first cobot module.

18. The network of modules according to claim 12, wherein the second cobot module is configured to report to the first cobot module based on a protocol that includes an identifier uniquely associated with the first cobot module.

19. The network of modules according to claim 12, wherein the chosen plan is a satisfactory plan.

20. The network of modules according to claim 12, wherein when the second cobot module determines whether a utility function associated with a plan to solve the discrete problem meets a threshold and the determination is made without requiring an optimal plan.

21. The network of claim 12, wherein said threshold is non-zero parameter that represents at least a partial performance of the utility function, such that said determine step determines whether the utility function can be performed to an en extent that exceeds the at least a partial performance.

22. A method comprising:
    receiving a first request from a module, the request being associated with a discrete problem and being broadcast over a network of discrete modules;
    accepting the request based on the discrete problem to be solved;
    determining whether a utility function associated with a plan to solve the discrete problem meets a threshold, the plan including a plurality of steps;
    reporting to the requesting module a forecasted outcome of the chosen plan;
    receiving permission to implement the chosen plan;
    implementing the plan before any subplans are determined to be possible;
    broadcasting a second request to a plurality of other discrete modules in the network to implement any necessary subplans; and
    returning an indicia of success to the module sending the first request when all subplans have been returned to the module broadcasting the second request.

23. The method of claim 22, wherein accepting the request includes implementing an applicability function to determine if the receiving cobot can solve the discrete problem.

24. The method of claim 22, wherein the step of determining whether the utility function associated with the plan to solve the discrete problem is performed based on a confidence score.

25. The method of claim 22, wherein the step of determining whether the utility function associated with the discrete problem meets a threshold includes implementing at least two of a critic function, a goal function, and an applicability function.

26. The method of claim 25, wherein the critic function is configured to determine a status of the plan based on a predetermined schedule uniquely associated with that plan.

27. The method of claim 25, wherein the critic function is configured to produce an output to be reported to the module sending the first request when the implementation of the plan is ahead of a predetermined schedule uniquely associated with the plan.

28. The method of claim 22, further comprising: monitoring status of the implemented plan based on a schedule uniquely associated with the chosen plan.

29. The method of claim 22, further comprising:
    determining a solution to the discrete problem; and
    outputting the solution for further processing.

30. The method of claim 22, wherein said threshold is non-zero parameter that represents at least a partial performance of the utility function, such that said determining comprises determining whether the utility function can be performed to an en extent that exceeds the at least a partial performance.

31. The method of claim 22 further comprising said reporting preceding said receiving, and said implementing follows said receiving.

* * * * *